US008554394B2

(12) United States Patent
Shamasundar

(10) Patent No.: US 8,554,394 B2
(45) Date of Patent: Oct. 8, 2013

(54) SYSTEM AND METHOD FOR RENDERING AN AIRCRAFT COCKPIT DISPLAY FOR USE WITH AN IN-TRAIL PROCEDURE (ITP)

(75) Inventor: Raghu Shamasundar, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/407,475

(22) Filed: Feb. 28, 2012

(65) Prior Publication Data

US 2013/0226376 A1 Aug. 29, 2013

(51) Int. Cl.
*G01C 23/00* (2006.01)

(52) U.S. Cl.
USPC .................................................. 701/14; 701/4

(58) Field of Classification Search
USPC ........................................................ 701/14, 4
See application file for complete search history.

(56) References Cited

U.S. PATENT DOCUMENTS 3,875,379 A 4/1975 Vietor
5,077,673 A 12/1991 Brodegard et al.
5,574,647 A 11/1996 Liden
5,957,412 A 9/1999 Saint Upery et al.
6,085,145 A 7/2000 Taka et al.
6,127,944 A 10/2000 Daly et al.
6,148,259 A 11/2000 Hagelauer
6,433,729 B1 8/2002 Staggs
6,690,298 B1 2/2004 Barber et al.
6,696,980 B1 2/2004 Langner et al.
6,720,891 B2 4/2004 Chen et al.
6,799,114 B2 9/2004 Etnyre
6,816,780 B2 11/2004 Naimer et al.
6,828,921 B2 12/2004 Brown et al.
6,839,018 B2 1/2005 Szeto et al.
6,876,906 B1 4/2005 Zellers et al.
6,946,976 B1 9/2005 Langner et al.
6,963,291 B2 11/2005 Holforty et al.
7,103,455 B2 9/2006 Subelet
7,366,591 B2 4/2008 Hartmann et al.
7,367,526 B2 5/2008 Baudry
7,375,678 B2 5/2008 Feyereisen et al.
7,386,373 B1 6/2008 Chen et al.

(Continued)

FOREIGN PATENT DOCUMENTS

EP 1752739 A2 2/2007
EP 1752739 A3 1/2008

(Continued)

OTHER PUBLICATIONS

Chartrand, R. C. et al.; Operational Improvements From Using the In-Trail Procedure in the North Atlantic Organized Track System, Oct. 2009.

(Continued)

*Primary Examiner* — Mary Cheung
*Assistant Examiner* — Yuen Wong
(74) *Attorney, Agent, or Firm* — Ingrassia Fisher & Lorenz, P.C.

(57) ABSTRACT

A method for rendering symbology on a cockpit display of a host aircraft, relating to a proposed ITP transition, is provided. The method comprises analyzing data to predict an ITP transition that is possible and economical, rendering on the display symbology textually representative of the possible ITP transition, and rendering on the display symbology textually representative of the time before which the ITP transition is possible.

18 Claims, 8 Drawing Sheets

(56) References Cited

U.S. PATENT DOCUMENTS

| | | | |
|---|---|---|---|
| 7,403,843 B2 | 7/2008 | Gremmert | |
| 7,453,375 B2 | 11/2008 | Chamas et al. | |
| 7,471,995 B1 | 12/2008 | Robinson | |
| 7,570,178 B1 | 8/2009 | Whalen et al. | |
| 7,650,232 B1 | 1/2010 | Paielli | |
| 7,746,343 B1 | 6/2010 | Charaniya et al. | |
| 7,747,382 B2 | 6/2010 | Small et al. | |
| 7,877,197 B2 | 1/2011 | Lewis et al. | |
| 7,961,135 B2 | 6/2011 | Smith et al. | |
| 7,965,223 B1 | 6/2011 | McCusker | |
| 2002/0075171 A1 | 6/2002 | Kuntman et al. | |
| 2002/0089432 A1 | 7/2002 | Staggs et al. | |
| 2002/0133294 A1 | 9/2002 | Farmakis et al. | |
| 2006/0290562 A1 | 12/2006 | Ehresman | |
| 2008/0065312 A1 | 3/2008 | Coulmeau et al. | |
| 2008/0266054 A1* | 10/2008 | Crank | 340/5.52 |
| 2008/0288164 A1 | 11/2008 | Lewis et al. | |
| 2008/0309518 A1 | 12/2008 | Aung | |
| 2009/0024311 A1 | 1/2009 | Hess | |
| 2009/0088972 A1 | 4/2009 | Bushnell | |
| 2009/0231163 A1 | 9/2009 | He | |
| 2009/0267800 A1 | 10/2009 | Hammack et al. | |
| 2010/0023187 A1 | 1/2010 | Gannon et al. | |
| 2010/0070180 A1 | 3/2010 | Ridenour | |
| 2010/0131121 A1 | 5/2010 | Gerlock | |
| 2010/0152932 A1 | 6/2010 | Das | |
| 2010/0286900 A1 | 11/2010 | Depape et al. | |
| 2010/0292871 A1 | 11/2010 | Schultz et al. | |
| 2010/0305783 A1 | 12/2010 | Tucker et al. | |
| 2010/0332054 A1* | 12/2010 | Brandao et al. | 701/3 |
| 2011/0006918 A1 | 1/2011 | Shafaat et al. | |
| 2011/0066360 A1 | 3/2011 | Haissig | |
| 2011/0066362 A1 | 3/2011 | He | |
| 2011/0118981 A1 | 5/2011 | Chamlou | |
| 2011/0187588 A1 | 8/2011 | Khatwa et al. | |
| 2011/0224847 A1 | 9/2011 | Singer et al. | |
| 2011/0231096 A1 | 9/2011 | Ridenour, II | |
| 2011/0270472 A1 | 11/2011 | Shafaat et al. | |
| 2011/0270473 A1 | 11/2011 | Reynolds et al. | |
| 2011/0276198 A1 | 11/2011 | Khatwa et al. | |
| 2011/0282568 A1 | 11/2011 | Khatwa et al. | |
| 2011/0316857 A1 | 12/2011 | Pepitone et al. | |

FOREIGN PATENT DOCUMENTS

| | | |
|---|---|---|
| EP | 1947624 A1 | 7/2008 |
| EP | 2071542 A2 | 6/2009 |
| EP | 2345872 A2 | 7/2011 |
| FR | 2898675 A1 | 3/2006 |
| FR | 2910124 A1 | 12/2006 |

OTHER PUBLICATIONS

Murdoch, J. L. et al.; Enhanced Oceanic Operations Human-In-The-Loop In-Trail Procedure Validation Simulation Study, NASA/TP-2008-215313, Jun. 2008.

Jones, K.M.; ADS-B In-Trail Procedures, Overview of Research Results; National Aeronautics and Space Administration; Presented to the ASAS TN2 Workshop, Sep. 2007.

Alam, S, et al.; An Assessment of BADA Fuel Flow Methodologies for In-Trail Procedure Evaluation; Defence & Security Applications Research Centre, University of New South Wales, Australian Defence Force Academy, Canberra, Australia.

Munoz, C.A. et al.; In-Trail Procedure (ITP) Algorithm Design; National Institute of Aerospace; Hampton, VA.

Richards, W.R. et al.; New Air Traffic Surveillance Technology; www.boeing.com/commercial/aeromagazine.

Chartrand et al.; Operational Improvements form the In-Trail Procedure in the North Atlantic Organized Track System; American Institure of Aeronautics and Astronautics.

Federal Aviation Administration; NextGen Operator and Airport Enablers; Supplement to NextGen Investment for Operators and Airports, FAA's NextGen Implementation Plan, Mar. 2011.

Koeners, J.; deVries, M.; Delft University of Technology, Delft, The Netherlands; Conflict Resolution Support for Air Traffic Control Based on Solution Spaces: Design and Implementation; 2008 IEEE.

EP Search Report, EP11 154 857.4, dated Apr. 11, 2012.

USPTO Office Action for U.S. Appl. No. 12/721,146; Notification Date Jan. 9, 2012.

EP Examination Report for EP 11 154 857.4, dated May 22, 2012.

USPTO Final Office Action for U.S. Appl. No. 12/774,513; notification date Aug. 30, 2012.

USPTO Office Action for U.S. Appl. No. 12/774,513; Notification date May 2, 2012.

USPTO Notice of Allowance for U.S. Appl. No. 12/721,146; notification date Jun. 7, 2012.

RTCA, Inc.; Safety, Performance and Interoperability Requirements Document for the In-Trail Procedure in Oceanic Airspace (ATSA-ITP) Application; RTCA/DO-312, Jun. 19, 2008.

USPTO Office Action for U.S. Appl. No. 12/563,691; notification date Dec. 9, 2011.

USPTO Final Office Action for U.S. Appl. No. 12/563,691; notification date Mar. 30, 2012.

EP Search Report, EP 10 166 821.8, dated Apr. 21, 2011.

EP Communication for EP 10 166 821.8 dated May 23, 2011.

USPTO Notice of Allowance for U.S. Appl. No. 12/774,513; notification date Dec. 11, 2012.

EP Search Report dated May 6, 2013 for application No. EP 11 154 900.2.

* cited by examiner

SYSTEM AND METHOD FOR RENDERING AN AIRCRAFT COCKPIT DISPLAY FOR USE WITH AN IN-TRAIL PROCEDURE (ITP)

TECHNICAL FIELD

Embodiments of the subject matter described herein relate generally to avionics systems such as cockpit flight display systems. More particularly, embodiments of the subject matter described herein relate to a system and method for displaying symbology on a cockpit display that relates to an In-Trail Procedure (ITP).

BACKGROUND

An in-trail procedure (ITP) is a protocol followed by an aircraft that desires to change its current flight level to a new flight level by descending or climbing in front of or behind one or more potentially blocking aircraft flying at an intervening flight level. In accordance with ITP criteria, certain conditions must be satisfied before the flight crew member issues a request for clearance to proceed with the flight level change. Whether or not the conditions are satisfied will depend on a number of dynamically changing factors associated with the host aircraft and other aircraft, such as the current geographic position of the aircraft, the current speed of the aircraft, the current heading of the aircraft, the desired new flight level, and the current flight level.

Modern flight deck instrumentation might include a flight-management system display that provides a two-dimensional representation of a host aircraft and neighboring aircraft. Such display systems typically provide a number of parameters and visual indicators that enable a pilot to form a quick mental picture of the vertical situation of the host aircraft. For example, such a system might include displays of an aircraft symbol, the aircraft altitude, the vertical flight plan, and terrain. In this manner, a member of the aircraft flight crew can obtain information related to the vertical situation of the aircraft relative to other aircraft with a simple glance at the display system.

Such a system could be used to identify the vertical position of potentially blocking aircraft for purposes of an ITP; however, a flight crew member may still need to mentally interpret the traffic situation and/or perform calculations related to the designation of potentially blocking aircraft and related to the determination of whether conditions merit that an ITP protocol be used for a desired flight level change. This is further complicated by the many factors that inference the perceived benefit of an ITP such as wind profile at various flight levels, traffic, fuel performance, etc.

BRIEF SUMMARY

A method for rendering symbology on a cockpit display of a host aircraft, relating to a proposed ITP transition, is provided. The method comprises analyzing data to predict an ITP transition that is possible and economical, rendering on the display symbology textually representative of the possible ITP transition, and rendering on the display symbology textually representative of the time before which the ITP transition is possible.

Also provided is a method for executing an ITP transition. The method comprises analyzing data to predict an ITP transition that is possible and results in reduced fuel consumption. Symbology is rendered on a cockpit display textually representative of the predicted ITP transition. In addition, symbology is rendered on the cockpit display textually representative of a time before which the ITP transition may be executed. The predicted ITP execution may be selected on the display.

An aircraft display system is also provided. The system includes a cockpit display, and a processor coupled to the cockpit display, the processor configured to (1) analyze data to predict an ITP transition that is possible and economical, (2) generate symbology for rendering the ITP transition on the cockpit display, and (3) rendering on the cockpit display symbology textually representative of the time before which the ITP transition is possible.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
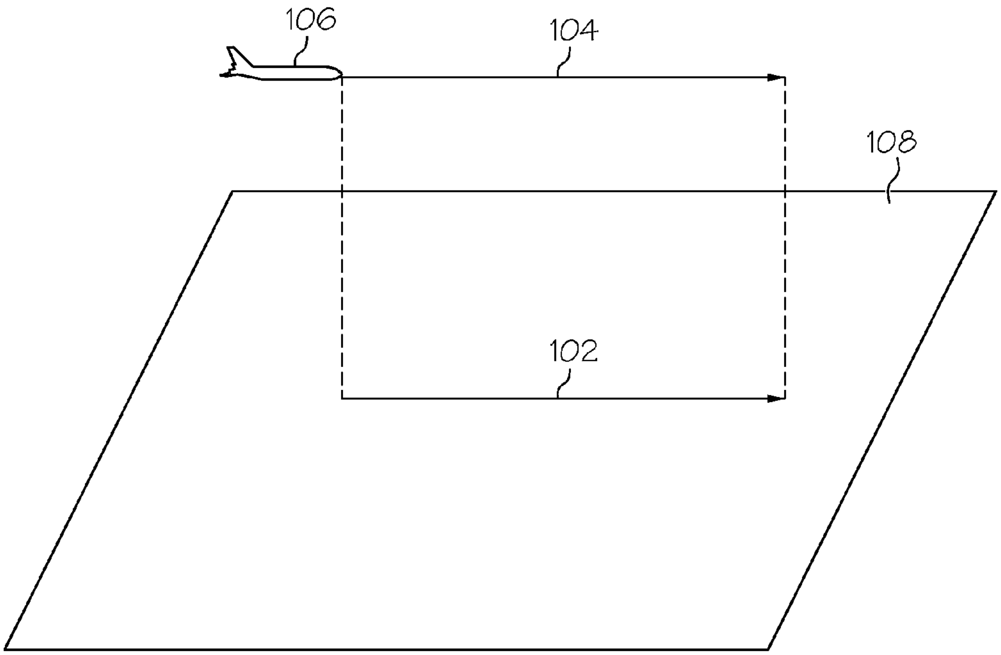
FIG. 1 is a diagram that illustrates the track associated with the flight path of an aircraft.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Although not always required, the techniques and technologies described here are suitable for use by aircraft using the ITP in an oceanic (or other) track system. For example, the techniques and technologies presented here could be used in connection with the ITP as defined and explained in *Operational Improvements From Using the In-Trail Procedure in the North Atlantic Organized Track System*, by Ryan C. Chartrand et al., National Aeronautics and Space Administration (October 2009) (hereinafter referred to as the "NASA Document"). For ease of understanding and clarity, the following description employs terminology that is consistent with that used in the NASA Document. Moreover, the relevant portions of the NASA Document are incorporated by reference herein.

Figure 2:
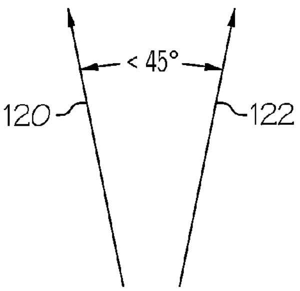
FIG. 2 is a diagram that illustrates the diverging tracks associated with two different aircraft.

FIG. 2 is a diagram that illustrates track 102 associated with the flight path 104 of aircraft 106. Track 102 represents a projection of the flight path 104 onto a flat plane 108, which may correspond to the ground. Accordingly, track 102 will be the same whether the aircraft 106 maintains a fixed altitude, climbs, or descends while following flight path 104.

Figure 3:
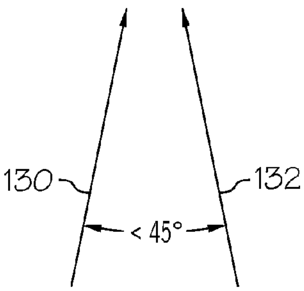
FIG. 3 is a diagram that illustrates the converging tracks associated with two different aircraft.

The NASA Document specifies that the host aircraft and any neighboring aircraft of interest (i.e., a potentially blocking aircraft) must be "same direction" aircraft in order for an ITP flight level change to be requested. In this regard, "same direction" tracks are intersecting tracks (or portions thereof) having an angular difference of less than 45 degrees. As an example, FIG. 2 is a diagram that illustrates the tracks 120 and 122 associated with two different aircraft. Even though the tracks 120/122 are divergent, they are considered to be in the same direction for purposes of the ITP because the angle between them is less than 45 degrees. As another example, FIG. 3 illustrates the tracks 130/132 associated with two different aircraft. Even though the tracks 130/132 are convergent, they are considered to be in the same direction for purposes of the ITP because the angle between them is less than 45 degrees.

Figure 4:
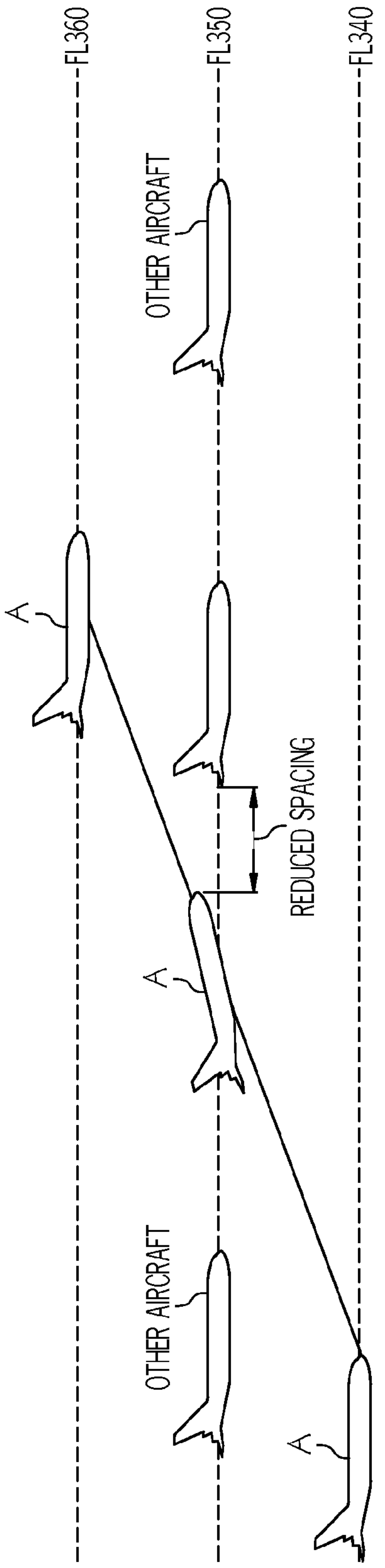
FIG. 4 is a diagram that illustrates a basic ITP transition.

The ITP is a protocol that can be followed when an aircraft seeks to change its flight level to a new flight level in the presence of a potentially blocking aircraft located at an intervening flight level. For example, FIG. 4 is a vertical profile view illustrating a basic ITP procedure. In this case, aircraft A (i.e. the ITP aircraft) is seeking approval of an ITP procedure to climb from an initial flight level (FL340) through an intervening flight level (FL350) to a desired flight level (FL360). According to the NASA Document, the "ITP is intended to enable altitude changes that are otherwise blocked when aircraft are spaced at less than current separation standards at altitudes between the current and desired altitudes of a requesting aircraft." The ITP specifies some minimum separation between aircraft at the current and requested flight levels, to ensure safe altitude changes. Moreover, the ITP specifies certain criteria that must be satisfied before the host aircraft can issue a request for ITP flight level change (such requests are issued to Air Traffic Control (ATC)). Although different criteria could be utilized by an embodiment of the subject matter described here, the NASA Document indicates the following ITP initiation criteria, where at least one of two conditions must be met: (1) if the ITP distance to a reference aircraft is greater than or equal to 15 nautical miles, then the groundspeed differential between the two aircraft must be less than or equal to 20 knots; or (2) if the ITP distance to a reference aircraft is greater than or equal to 20 nautical miles, then the groundspeed differential between the two aircraft must be less than or equal to 30 knots.

Figure 5:
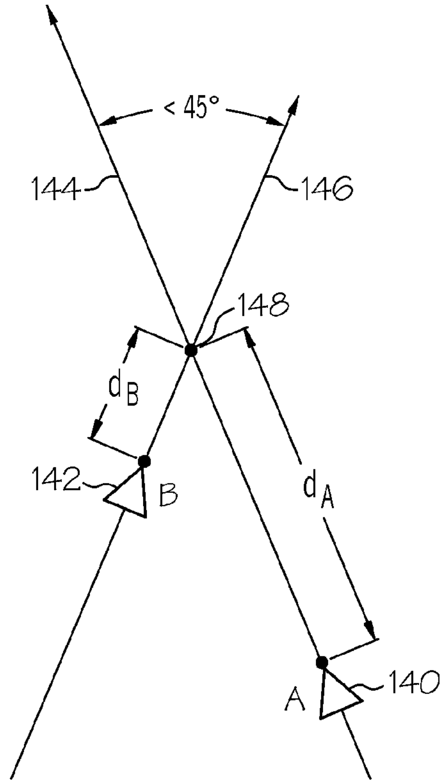
FIG. 5 is a diagram that illustrates the intersecting tracks associated with two different aircraft.

The ITP distance represents one appropriate measure of distance between the host aircraft and a nearby reference aircraft (a potentially blocking aircraft, which may be in front of or behind the host aircraft). Depending upon the particular embodiment, other distance metrics, distance measures, or relative spacing metrics could be used. For instance, the system could contemplate linear distance, time, aircraft acceleration, relative speed, closing rate, and/or other measureable or computable values that are dependent on the current geographic position, speed, acceleration, heading, attitude, or other operating status of the aircraft. The NASA Document defines the ITP distance as "the difference in distance to a common point along each aircraft's track." In this regard, FIG. 5 is a diagram that illustrates the intersecting tracks associated with two different aircraft. In FIG. 5, one aircraft 140 is labeled "A" and another aircraft 142 is labeled "B". The aircraft 140 has a corresponding track 144, and the aircraft 142 has a corresponding track 146 that intersects the track 144 at a point 148. Note that the aircraft 140/142 are considered to be in the same direction because the angle between the two tracks 144/146 is less than 45 degrees. In FIG. 5, the label "$d_A$" identifies the current distance between the aircraft 140 and the point 148, and the label "$d_B$" identifies the current distance between the aircraft 142 and the point 148. For this example, the ITP distance ($d_{ITP}$) is defined by the following expression:

$$d_{ITP}=|d_A-d_B|.$$

Figure 6:
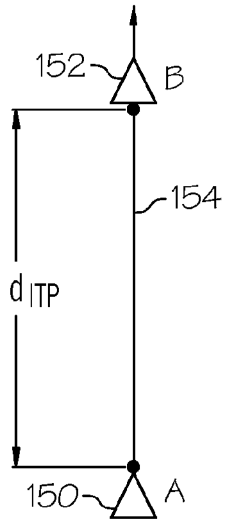
FIG. 6 is a diagram that illustrates the overlapping tracks associated with two different aircraft.

As another example, FIG. 6 is a diagram that illustrates the overlapping tracks associated with two different aircraft. In FIG. 6, one aircraft 150 is labeled "A" and another aircraft 152 is labeled "B". In this scenario, the two aircraft have a common or overlapping track 154. Consequently, the current distance between the two aircraft is also considered to be the ITP distance under these conditions. In FIG. 6, the label "$d_{ITP}$" indicates the current ITP distance between the aircraft 150 and the aircraft 152.

The system and methods presented here can be utilized to generate a flight deck display that includes a graphical indication of whether or not an in-trail transition (ITT) (a transition from one flight level to another pursuant to an ITP maneuver) is appropriate for the current flight conditions. In certain embodiments, the flight deck display is included in a typical Flight Management System (FMS). An ITT Procedure Menu page of the display includes an identification of the current cruise flight level and current time. Possible transformation flight levels are also listed in flight level windows or fields on the display. Associated with each possible destination flight level, are status windows containing relevant information regarding whether an ITT to the associated flight level is advisable or even possible. For example, the display might indicate that a requested ITT is not economical perhaps because of winds at the requested flight level that result in increased fuel consumption thus increasing cost and carbon emissions. Perhaps an ITT to a new flight level wind require a return to the original flight level due to restricted air space thus mitigating any advantage of changing to the new flight level. If the ITT to the new flight level is warranted, the display will indicate that the transition is possible before a specified time. This page of the display will also indicate for each flight level if an Air Traffic Control (ATC) is pending or approved. It is also contemplated that a separate page referred to as the Altitude Request page on the display will consist of a request for an ITT to a specific flight level. The requested flight level may be auto-filled from the ITT Procedure Menu by selecting the desired flight level on the ITT Procedure Menu or by manually entering the desired flight level on an Altitude Request page. ATC approval will be reflected on the ITT Procedure Menu page. In certain embodiments, regions on the ITT Menu page and Altitude Request page may be rendered in a specific color that may change to reflect an altered condition; pending, approved, open, etc. Data retrieval may be automatic or manual. In the manual mode, a pilot manually requests a transition to a desired flight by inputting the flight level data on the Altitude Request page. In the automatic mode, the desired flight level is selected from one or more flight level on the ITT Procedure Menu generated by the Flight Management System (FMS), and the information is automatically reflected on the Altitude Request page.

Figure 7:
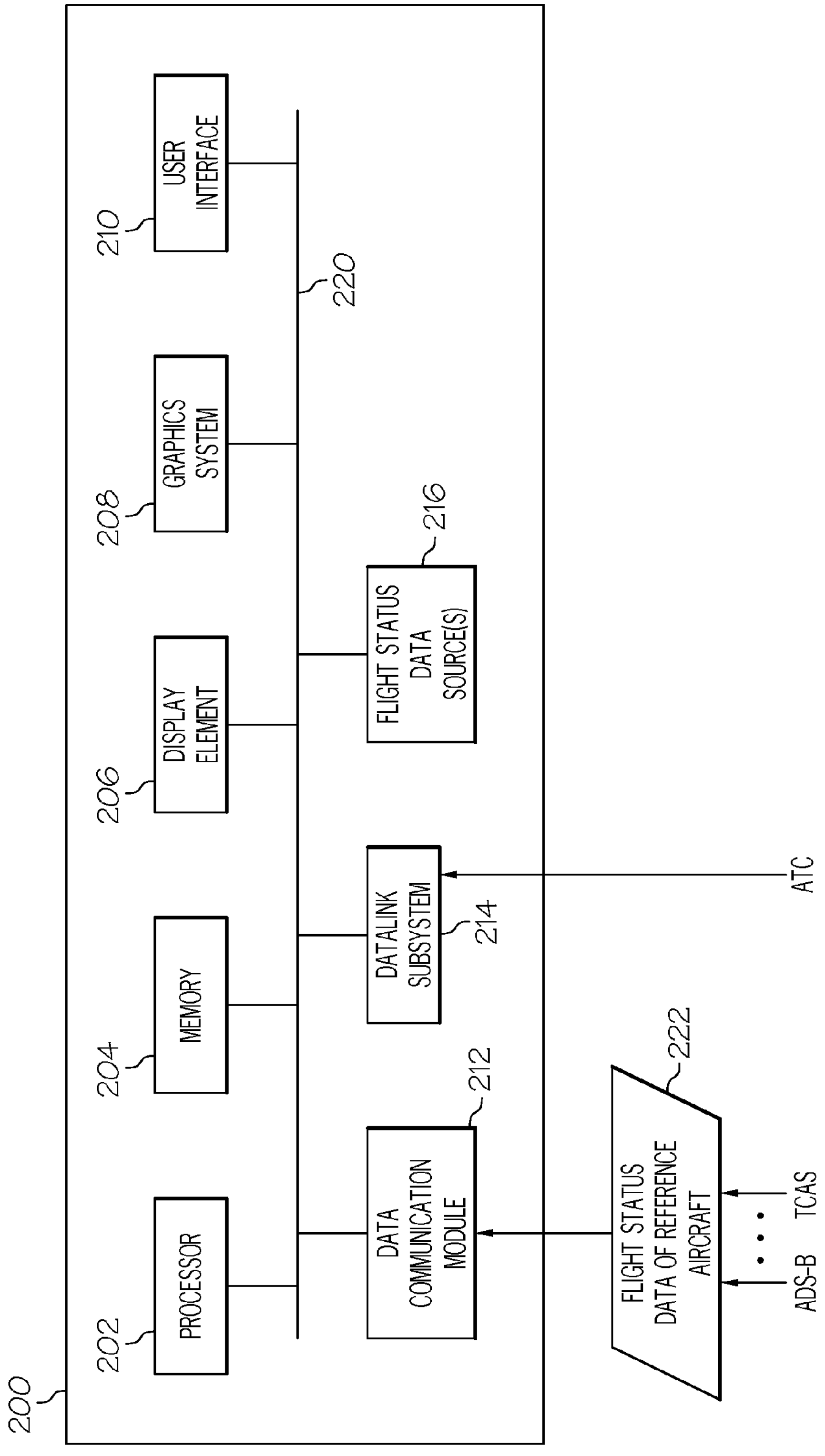
FIG. 7 is a block diagram of an exemplary embodiment of a flight deck display system.

The above described displays can be generated using a suitably configured onboard system, such as a flight deck display system. More preferably, the display can be generated by the (FMS). In this regard, FIG. 7 is a schematic representation of an exemplary embodiment of a flight deck display system 200 that is suitable for use with a vehicle such as an aircraft. In exemplary embodiments, the display system 200 is located onboard the host aircraft, i.e., the various components and elements of the display system 200 reside within the host aircraft, are carried by the host aircraft, or are attached to the host aircraft. The illustrated embodiment of the display system 200 includes, without limitation: at least one processor 202; an appropriate amount of memory 204; a display element 206; a graphics system 208; a user interface 210; a data communication module 212; a data link subsystem 214; and at least one source of flight status data 216. These elements of the display system 200 may be coupled together by a suitable interconnection architecture 220 that accommodates data communication, the transmission of control or command signals, and/or the delivery of operating power within the display system 200. It should be understood that FIG. 7 is a simplified representation of the display system 200 that will be used for purposes of explanation and ease of description, and that FIG. 7 is not intended to limit the application or scope of the subject matter in any way. In practice, the display system 200 and the host aircraft will include other devices and components for providing additional functions and features, as will be appreciated in the art. Furthermore, although FIG. 7 depicts the display system 200 as a single unit, the individual elements and components of the display system 200 could be implemented in a distributed manner using any number of physically distinct pieces of hardware or equipment.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 202 obtains and processes current flight status data (of the host aircraft and one or more reference aircraft) to determine the ITP status windows for the host aircraft, and to control the rendering of the ITP display in an appropriate manner.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. In practice, a functional or logical module/component of the display system 200 might be realized using program code that is maintained in the memory 204. For example, the graphics system 208, the data communication module 212, or the datalink subsystem 214 may have associated software program components that are stored in the memory 204. Moreover, the memory 204 can be used to store data utilized to support the operation of the display system 200, as will become apparent from the following description.

In an exemplary embodiment, the display element 206 is coupled to the graphics system 208. The graphics system 208 is coupled to the processor 202 such that the processor 202 and the graphics system 208 cooperate to display, render, or otherwise convey one or more graphical representations, synthetic displays, graphical icons, visual symbology, or images associated with operation of the host aircraft on the display element 206, as described in greater detail below. An embodiment of the display system 200 may utilize existing graphics processing techniques and technologies in conjunction with the graphics system 208. For example, the graphics system 208 may be suitably configured to support well known graphics technologies such as, without limitation, VGA, SVGA, UVGA, or the like.

In an exemplary embodiment, the display element 206 is realized as an electronic display configured to graphically display flight information or other data associated with operation of the host aircraft under control of the graphics system 208. In practice, the processor 202 and/or the graphics system 208 produces image rendering display commands that are received by the display element 206 for purposes of rendering the display. The display element 206 is usually located within a cockpit of the host aircraft. It will be appreciated that although FIG. 7 shows a single display element 206, in practice, additional display devices may be present onboard the host aircraft.

The illustrated embodiment of the display system 200 includes a user interface 210, which is suitably configured to receive input from a user (e.g., a pilot) or other crew member and, in response to the user input, supply appropriate command signals to the processor 202. The user interface 210 may be any one, or any combination, of various known user interface devices or technologies, including, but not limited to: a touchscreen, a cursor control device such as a mouse, a trackball, or joystick; a keyboard; buttons; switches; or knobs. Moreover, the user interface 210 may cooperate with the display element 206 and the graphics system 208 to provide a graphical user interface. Thus, a user can manipulate the user interface 210 by moving a cursor symbol rendered on the display element 206, and the user may use a keyboard to, among other things, input textual data. For example, the user could manipulate the user interface 210 to enter a desired or requested new flight level into the display system 200.

In an exemplary embodiment, the data communication module 212 is suitably configured to support data communication between the host aircraft and one or more remote systems. More specifically, the data communication module 212 is used to receive current flight status data 222 of other aircraft that are near the host aircraft. In particular embodiments, the data communication module 212 is implemented as an aircraft-to-aircraft data communication module that receives flight status data from an aircraft other than the host aircraft. For example, the data communication module 212 may be configured for compatibility with Automatic Dependant Surveillance-Broadcast (ADS-B) technology, with Traffic and Collision Avoidance System (TCAS) technology, and/or with similar technologies.

The flight status data 222 may include, without limitation: airspeed data; fuel consumption; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 200 is suitably designed to process the flight status data 222 in the manner described in more detail herein. In particular, the display system 200 can use the flight status data 222 when rendering the ITP display.

The datalink subsystem 214 enables the host aircraft to communicate with Air Traffic Control (ATC). In this regard, the datalink subsystem 214 may be used to provide ATC data to the host aircraft and/or to send information from the host aircraft to ATC, preferably in compliance with known standards and specifications. Using the datalink subsystem 214, the host aircraft can send ITP requests to ground based ATC stations and equipment. In turn, the host aircraft can receive ITP clearance or authorization from ATC (when appropriate) such that the pilot can initiate the requested flight level change.

Figure 8:
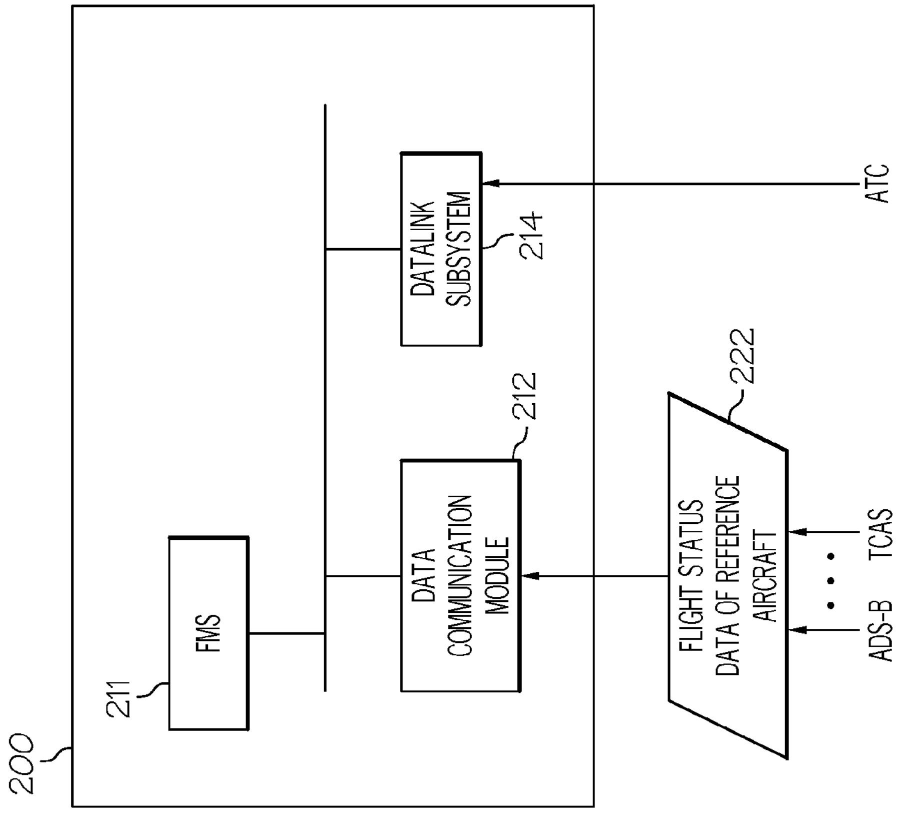
FIG. 8 is a block diagram of a further exemplary embodiment of a flight deck display system.

In operation, the display system 200 is also configured to process the current flight status data for the host aircraft. In this regard, the sources of flight status data 216 generate, measure, and/or provide different types of data related to the operational status of the host aircraft, the environment in which the host aircraft is operating, flight parameters, and the like. In practice, the sources of flight status data 216 may be realized using line replaceable units (LRUs), transducers, accelerometers, instruments, sensors, and other well-known devices. The data provided by the sources of flight status data 216 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; fuel consumption, etc. The display system 200 is suitably designed to process data obtained from the sources of flight status data 216 in the manner described in more detail herein. In particular, the display system 200 can use the flight status data of the host aircraft when rendering the ITP display. FIG. 8 is a block diagram of another exemplary embodiment of a cockpit display system wherein a number of the elements shown in FIG. 7 and their functions have been subsumed by Flight Management System 211.

As stated previously, it would be desirable to provide a system for generating ITP process that considers factors such as traffic, wind profile at various flight levels, fuel performance, flight path, and other factors that influence the perceived benefit of an ITP transition in order to determine if an ITP protocol should be employed to achieve a desired flight level change. This contemplates, in brief, the use of a new ITP execution procedure algorithm that considers the above factors to generate symbology corresponding to one or more potential ITP opportunities and the time remaining to execute each of the one or more opportunities and time-remaining on a cockpit display. More specifically, it is contemplated that data such as flight plan data (i.e. is the proposed flight level change economical given the overall flight plan); ITP standard parameters (e.g. speed vs. distance), relative speed; relative tracks; range; vertical speed; maneuvering ability given current settings; pitch and roll factors; traffic; etc. will be considered.

Figure 9:
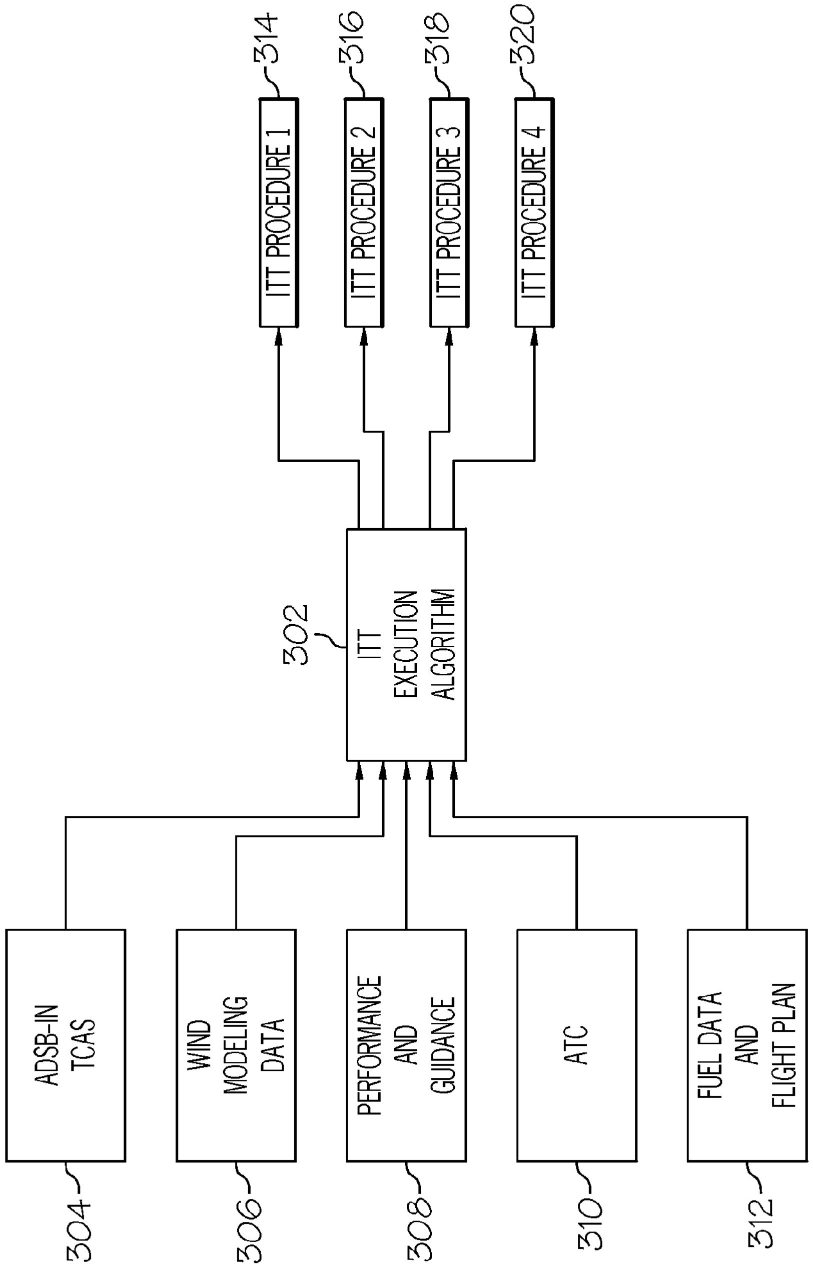
FIG. 9 is a flow chart that illustrates an exemplary embodiment of an ITP display process.

The above is generally represented in the block diagram of FIG. 9 wherein it can be seen that ITT execution algorithm 302 receives data regarding intruder and reference aircraft (block 304); wind modeling and related data (block 306); performance data such as flight cost index, predicted route information, etc.; guidance data (block 308), traffic and related data (block 310); and fuel data including current fuel and reserve fuel (block 312). This data is processed by ITT execution algorithm 32, which generates symbology representative of details associated with one or more potential ITP transitions. Four such potentials are shown as ITT Procedure 1, ITT Procedure 2, ITT Procedure 3, and ITT Procedure 4 shown in windows or fields 314, 316, 318, and 320, which are coupled to receive data from ITT execution algorithm.

Figure 10:
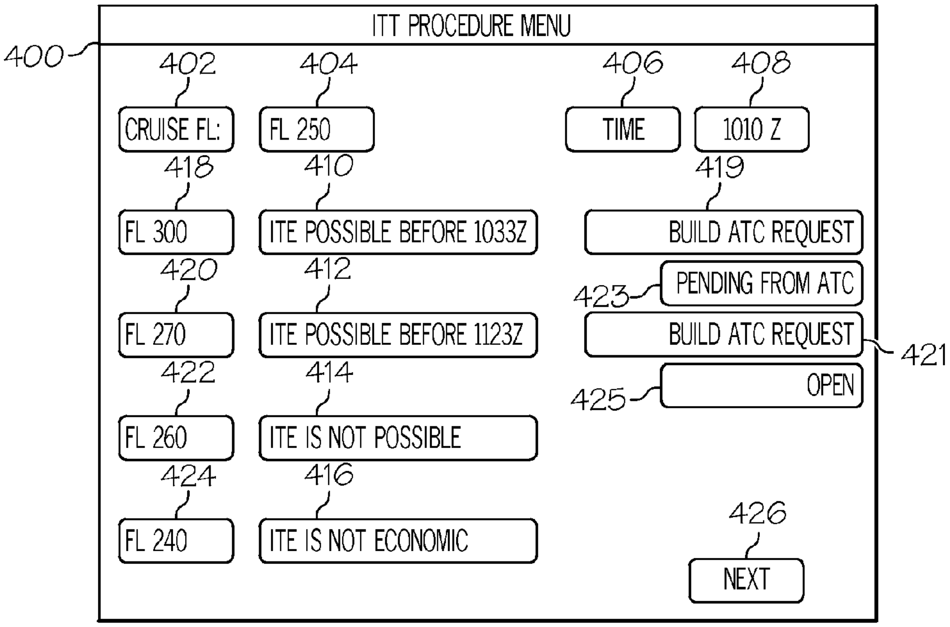
FIG. 10 illustrates symbology rendered on a flight deck display visually and textually representative of ITP opportunities generated using data such as wild profiles, fuel consumption, flight plan, etc.

FIG. 10 illustrates symbology rendered on an ITT Procedure Menu touch-screen display 400 (e.g. touchscreen or a page on a flight management display) visually and textually representative of ITP opportunities generated using the inputs described above in connection with FIG. 9 analyzed by ITT execution algorithm 302. As can be seen, display 400 includes a plurality of fields. Fields 402 and 404 indicate that the current flight level of the host aircraft; i.e. FL250. Fields 406 and 408 indicate the current time 10:10z (i.e. 10:10 zulu or Greenwich Mean Time). Fields 410, 412, 414, and 416 are visually indicative of the viability of an ITT to flight levels 300, 270, 260, and 240 (fields 418, 420, 422, and 424 respectively) from the current flight level FL250. For example, field 410 indicates that an ITT to flight level FL 300 is possible and viable but must be commenced before 10:33z. Field 420 indicates that an ITT to flight level 270 is possible and viable, but must be commenced no later than 11:23z. Field 114 indicates that an ITT transition through FL 260 is not possible, perhaps because one or more of the requirements necessary for an ITP, above described, are not met. Thus, even though the host aircraft cruising at FL 205 may transition through FL270 and FL300, it must remain at FL260 because FL 260 is blocked. It should be clear that more or fewer in-trail transitions may be involved to achieve a climb or descent from a current flight level to a desired flight level.

With respect to field 416, the ITT execution algorithm has determined that an ITT would not be economical. For example, whatever advantage gained by descending from FL250 through FL240 may be offset by a subsequent ascent through FL240 required by a subsequent flight plan requirement.

For each possible ITP transition, 410 and 412, a Build ATC Request field may be selected, 418 and 420, respectively. Symbology is generated in field 424 displaying the word "OPEN" textually representing that the building of an ATC request for a transition through FL270 has not been made. In contrast, symbology has been generated for display in field 422 textually representing that an ATC request has been made by touching or otherwise selecting field 418 in the well-known manner and is pending. When the time for obtaining ATC approval of an ITP is drawing close to time after which the transition would be possible, the respective field could change color; e.g. from green to red to alert the pilot. Finally, field 426 is provided for advancing the display to the next page or section.

Figure 11:
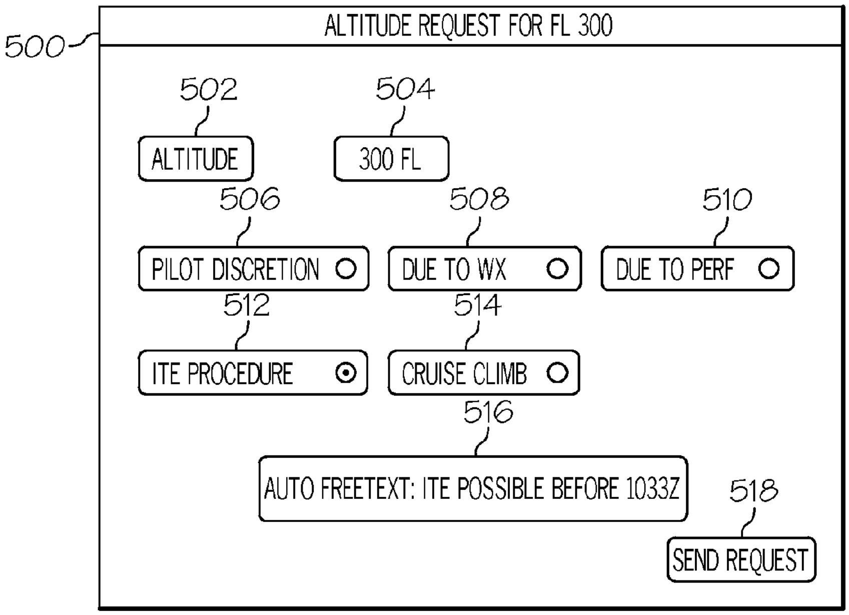
FIG. 11 illustrates symbology generated on a flight deck display visually and textually representative of an altitude request in accordance with an embodiment.

FIG. 11 is an example of a display page 500 on, for example, a FMS display corresponding to an altitude request for flight level 300. The desired flight level is reflected in windows 502 and 504. Fields 506, 508, 510, 512, and 514 each indicate a possible reason for requesting a flight level change including pilot discretion (field 506), weather (field 508), performance considerations (field 512), and a climb to a cruising altitude (field 514). In FIG. 11, field 512 has been selected (for example by touching) indicating a request for an ITP climb or descent. Unlike previous altitude request mechanisms, however, field 516 may be automatically populated when a pilot requests that specific ITT (field 410 and 418 in FIG. 10. By selecting field 518 (SEND REQUEST), the ITP request is sent to ATC.

Figure 12:
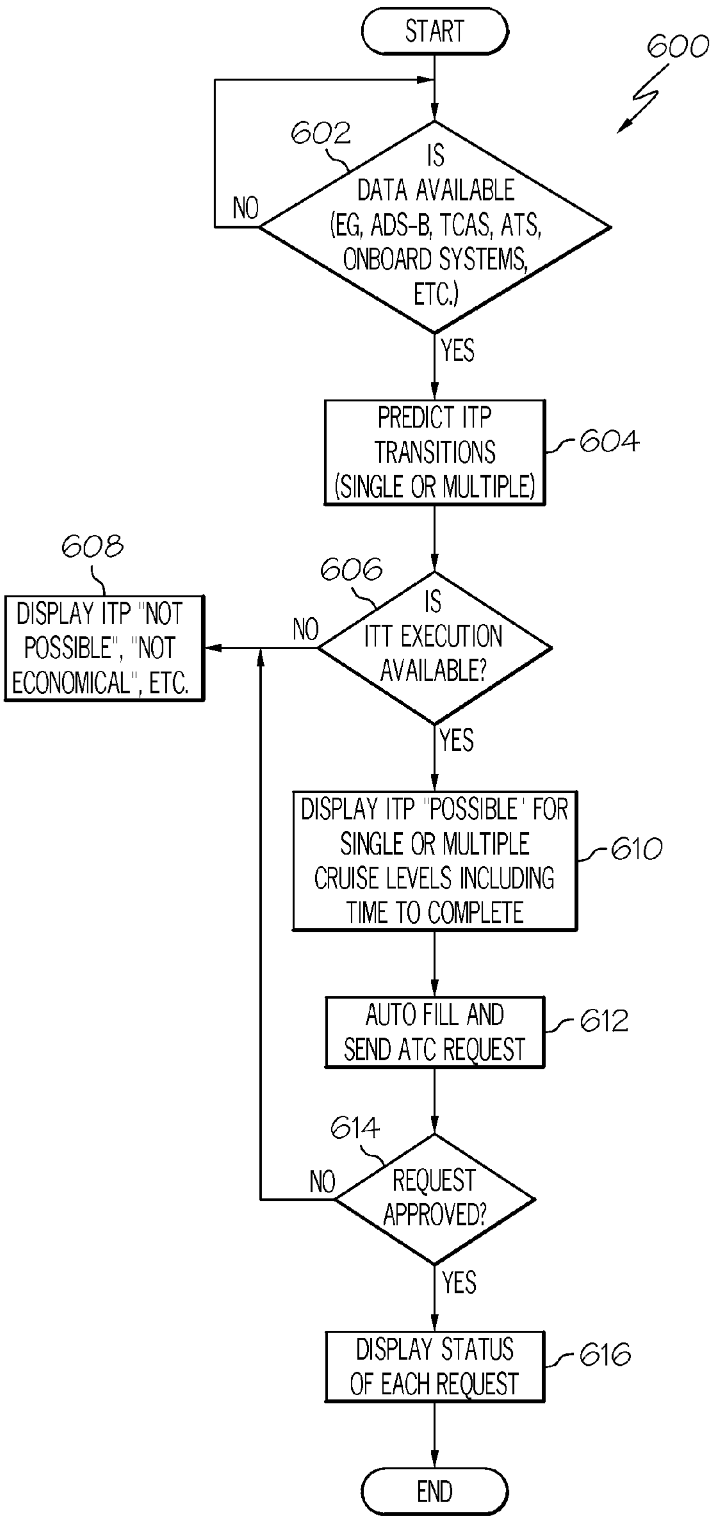
FIG. 12 is a flow chart illustrating an exemplary embodiment of an ITP display process suitable for use in conjunction with a flight deck display system.

FIG. 11 is a flow chart that illustrates an exemplary embodiment of an ITP display process 600 suitable for use with a flight deck display system shown in FIGS. 7 and 8. Process 600 represents one implementation of a method for displaying aircraft traffic information on an onboard display element of a host aircraft. The various tasks performed in connection with process 600 may be performed by software, hardware, firmware, or any combination thereof. For illustrative purposes, the following description of process 600 may refer to elements mentioned above in connection with FIGS. 7 and 8. In practice, portions of process 600 may be performed by different elements of the described system, e.g., a processor, a display element, or a data communication component. It should be appreciated that process 600 may include any number of additional or alternative tasks, the tasks shown in FIG. 12 need not be performed in the illustrated order, and process 600 may be incorporated into a more comprehensive procedure or process having additional functionality not described in detail herein. Moreover, one or more of the tasks shown in FIG. 12 could be omitted from an embodiment of the process 600 as long as the intended overall functionality remains intact.

In practice, process 600 can be performed in a virtually continuous manner at a relatively high refresh rate such that the display will be updated in real-time or substantially real time in a dynamic manner. This particular embodiment of process 600 begins (STEP 602) by obtaining data of the type described in FIG. 9 including the current flight status data of the host aircraft, and the current flight status data of one or more other aircraft near the host aircraft (e.g. TCAS, ADS-B). In preferred embodiments, this data is obtained using an appropriate aircraft-to-aircraft data communication technology and related subsystem components located onboard the host aircraft. This enables the host aircraft to receive the current flight status data of the other aircraft directly from the other aircraft. The data obtained in STEP 602 also includes wind modeling data, performance and guidance information, ATC data, fuel data, and flight plan data as previously discussed.

Process 600 may be performed in connection with an ITP routine, during which the pilot or other flight crew member desires to change the altitude (flight level) of the host aircraft. Accordingly, process 600 may acquire a requested or desired new flight level that is different than the current flight level of the host aircraft. This may be associated with user manipulation of a user interface element, e.g., manual entry of the new flight level. In a preferred embodiment, one or more ITP transitions may be predicted by the ITP execution algorithm (STEP 604). If, after analyzing the data obtained in STEP 602, it is determined that an ITP transition is not possible or economical (STEP 606), symbology is generated to display "ITT NOT POSSIBLE" or "ITT NOT ECONOMICAL", as the case may be, for the respective flight level(s) as is shown at 414 and 416 in FIG. 10 (STEP 608). If, on the other hand, an ITP transition is possible for one or more flight levels, this will be graphically represented on display 400 (FIG. 10) along with the time remaining to executed each approved ITP transition (STEP 610) as is shown at 401 and 412. For example, referring to FIG. 10, an ITP transition at FL 300 is possible before 10:33Z and an ITP transition is possible at FL 270 before 11:23Z.

In accordance with an embodiment, fields such as 418 and 420 (FIG. 10) are provided to initiate the automatic construction of an ATC request (STEP 612). For example, if user interface (210 in FIG. 7) is a touch-screen, a pilot or other crew member may touch field 418 and/or 420 to initiate the ATC request. In FIG. 10, it can be seen that an ATC request corresponding to FL 300 has been requested and is pending as is indicated in field 422, whereas an ATC request associated with FL270 has not been made, as is indicated by the indicia "OPEN" in field 424.

It is also contemplating that other means such as change in appearance may be utilized to indicate the status of an ITP request. For example, fields 418, 420, 422, and 424 may change color to indicate if a request has been made. Similarly, fields 418 and 420 may change in appearance to indicate a condition associated with the time remaining to make an ATC request. That is, field 418 may change in color to indicate that the time remaining will soon elapse. It should be noted that field 516 in the altitude request for FL 300 (display 500 in FIG. 11) is auto-filled with data corresponding to the ATC request made via ITT Procedure Menu (display 400 in FIG. 10.

If the ATC request is approved (STEP 614), the approved status will be displayed on the ITT menu (display 400) in field 422 (STEP 616). If not approved, the process returns to STEP 606.

Thus, there has been provided an aircraft display system that utilizes prediction of optimum flight levels that can be attained by a host aircraft, utilizing an ITP procedure. The system and method takes into consideration parameters such as wind profiles, fuel consumption, traffic, flight plan, etc. in order to determine if a flight level change is possible and advisable (e.g. is it economical?)

The above description is given by way of example only. Changes in form and details may be made by one skilled in the art without departing from the spirit and scope of the invention as defined by the appended claims and this specification.

What is claimed is:

1. A method for rendering on a cockpit display of a host aircraft, symbology relating to a proposed ITP transition, the method comprising:

analyzing data to predict a plurality of ITP transitions that are possible and economical;

rendering simultaneously on the display symbology that is textually representative of each possible ITP transition;

rendering on the display symbology textually that is representative of a time while each possible ITP transition is possible.

2. A method according to claim 1 further comprising analyzing at least one category of data selected from the group consisting of fuel consumption data, performance data, and wind modeling data to predict at least one possible ITP transition.

3. A method according to claim 2 further comprising analyzing flight plan data to predict at least one possible ITP transition.

4. A method according to claim 3 further comprising analyzing traffic data to predict at least one possible ITP transition.

5. A method according to claim 1 wherein the symbology that is textually representative of one or both of each possible ITP transition and the time while each possible ITP transition is possible changes color as the time remaining during which each ITP transition is possible and economical shortens.

6. A method according to claim 1 wherein the time is expressed as Greenwich Mean Time.

7. A method according to claim 1 further comprising determining if an ITP transaction is not possible for a specific flight level and rendering symbology textually representative of such on the cockpit display.

8. A method according to claim 1 further comprising determining if an ITP transition is not economical for a specific flight level and rendering symbology textually representative of such on the cockpit display.

9. A method according to claim 1 further comprising:

rendering symbology on the cockpit display visually representative of a selection field associated with each possible IPT transition.

10. A method according to claim 9 further comprising selecting on the cockpit display one of the selection fields and in response thereto, auto fill an air traffic control request for approval.

11. A method according to claim 10 further comprising:

rendering symbology on the cockpit display visually representing an updated status upon approval of the air traffic control request.

12. An aircraft display system comprising:

a cockpit display; and a processor coupled to the cockpit display, the processor configured to (1) analyze data to predict a plurality of IPT transitions that are possible and economical, (2) generate symbology for rendering each of the plurality of the IPT transitions simultaneously on the cockpit display, and (3) rendering on the cockpit display symbology textually representative of the time before which each of the plurality of the ITP transitions are possible.

13. An aircraft display system according to claim 12 wherein the processor is further configured to determine if an ITP transition is not possible for a specific flight level and render symbology textually representative of such on the cockpit display.

14. An aircraft display system according to claim 12 where the processor is further configured to determine if an ITP transition is not economical for a specific flight level and rendering symbology textually representative of such on the cockpit display.

15. An aircraft display system according to claim 12 wherein the processor is further configured to select a possible ITP transition and autofill and transmit an air traffic control request for approval of the ITP transition.

16. A method for executing an ITP transition, the method comprising:

analyzing data to predict a plurality of ITP transitions that are possible and results in reduced fuel consumption;

simultaneously rendering on a cockpit display symbology textually representative of the plurality of predicted ITP transitions;

rendering on the cockpit display symbology that is textually representative of a time before which each of the plurality of ITP transition may be executed; and selecting, on the display, one of the plurality of predicted ITP executions.

17. A method according to claim 16 further comprising:

populating an ATC approval request in response to selecting the predicted ITP execution; and transmitting the approval request to ATC.

18. A method according to claim 17 further comprising:

rendering symbology on the cockpit display visually, representative of the status of the ATC request.

* * * * *